(12) United States Patent
Bordosky

(10) Patent No.: US 9,345,236 B1
(45) Date of Patent: May 24, 2016

(54) BILATERAL TEASER OR LURE FOR FISHING

(71) Applicant: Brian T. Bordosky, Katy, TX (US)

(72) Inventor: Brian T. Bordosky, Katy, TX (US)

( * ) Notice: Subject to any disclaimer, the term of this patent is extended or adjusted under 35 U.S.C. 154(b) by 330 days.

(21) Appl. No.: 13/631,539

(22) Filed: Sep. 28, 2012

Related U.S. Application Data

(60) Provisional application No. 61/540,400, filed on Sep. 28, 2011.

(51) Int. Cl.
*A01K 85/00* (2006.01)

(52) U.S. Cl.
CPC ..................................... *A01K 85/00* (2013.01)

(58) Field of Classification Search
CPC ....................................................... A01K 85/00
USPC ........................................ 43/42, 42.45, 42.03
See application file for complete search history.

(56) References Cited

U.S. PATENT DOCUMENTS

| | | | | |
|---|---|---|---|---|
| 1,476,139 A | * | 12/1923 | Bingham | 43/42.5 |
| 4,574,514 A | * | 3/1986 | Kingston | 43/42.5 |
| 4,858,370 A | * | 8/1989 | Ryder | 43/43.13 |
| 5,732,502 A | * | 3/1998 | Hansen | 43/42.39 |
| 2008/0172925 A1 | * | 7/2008 | Hazel | 43/43.13 |

* cited by examiner

*Primary Examiner* — Christopher P Ellis
*Assistant Examiner* — Jessica Wong
(74) *Attorney, Agent, or Firm* — Karen B. Tripp

(57) ABSTRACT

A fishing teaser or lure having a bilateral body comprising two planar pieces in a perpendicular configuration having a fish shaped silhouette. The teaser or lure moves straight and/or laterally through the water when towed. The teaser or lure is particularly suited for deep sea fishing.

14 Claims, 5 Drawing Sheets

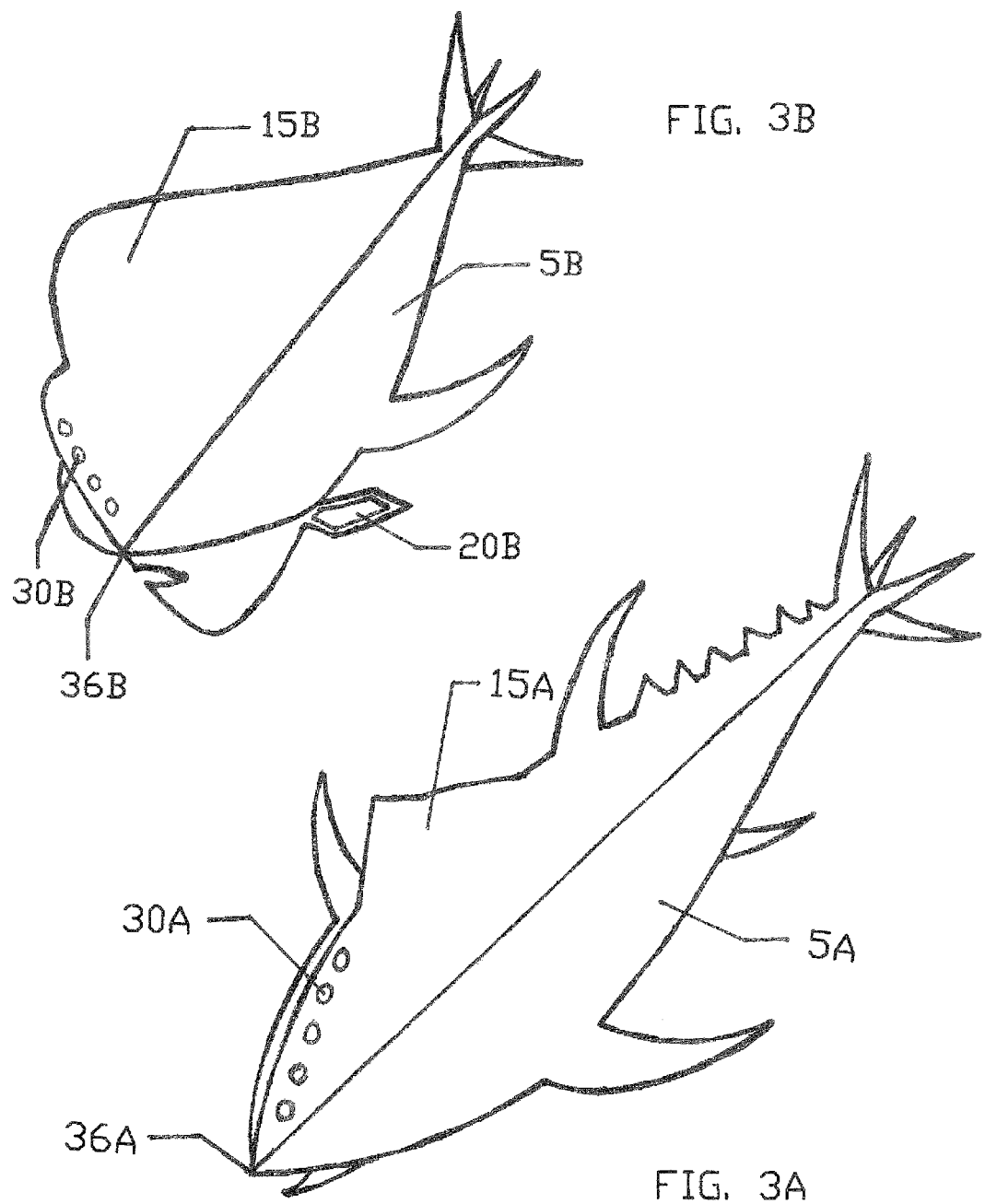

BILATERAL TEASER OR LURE FOR FISHING

RELATED APPLICATION

This application claims priority from U.S. Provisional Patent Application Ser. No. 61/540,400, filed Sep. 28, 2011.

BACKGROUND OF THE INVENTION

1. Field of the Invention

The present invention relates to a fishing teaser or lure particularly advantageous for deep sea fishing by being readily transportable while simultaneously affording a relatively large size and a natural prey appearance for attracting large game fish such as marlin, swordfish, sailfish and tuna.

2. Description of Relevant Art

Man has endeavored for centuries to master the art of fishing. Accordingly, man has sought out innovative methods and devices in order to ensure a productive day of fishing. Among such devices are fishing lures and teasers. Fishermen have discovered that even the best lures can be ineffective if the fish is not attracted to the lure. Thus teasers for attracting fish, supplemental to lures, can be even more important in catching fish than lures.

As used herein, a "teaser" is anything trolled behind a boat that doesn't have a hook in it. A "lure" is an object comprising a hook attached to the end of a fishing line which is designed to resemble and move like the prey of a fish, using movement, vibration, and color, to catch the fish's attention so it bites the hook. Lures are typically equipped with one or more single, double, or treble hooks that are used to hook fish when they attack the lure.

If a fisherman can't draw a fish to within the striking range of a lure, the fisherman is not going to be able to catch the fish. However, if a fisherman can make a predator fish think prey or food is at hand, the fisherman will have a good chance of catching the fish.

Devices in use for luring fish range from carefully crafted flies to artfully painted lures. Deep sea fishing or fishing for large game, such as marlin, swordfish, sailfish and tuna, give rise to special challenges as such game fish are not easily lured by small teasers or lures that might typically be useful in rivers or lakes, and yet large teasers and lures can be cumbersome for transport and in use are often easily damaged by the game fish.

A need exists for improved teasers and lures that have utility in deep sea fishing.

SUMMARY OF THE INVENTION

The present invention provides a fishing teaser or lure with a body having a bilateral configuration. The body has two planes, one on an x axis and the other on a y axis, which interlock or otherwise fit perpendicularly one to the other. The body is generally configured to have the outline or silhouette shape of a fish, preferably the type of fish that is known to be prey for the game fish for which the teaser or lure is to be used for fishing. The body is comprised of a material that is relatively light in weight, durable, and resistant to corrosion in sea water. One preferred but non-limiting example of such a suitable material is polycarbonate. Another is plastic. At least one and preferably about three or four holes are in the top forward portion comprising the head portion of the body to allow for the attachment of line and optionally also hooks. The holes also are positioned at different levels on the head so that depending on placement of the line, the body will rest higher or lower in the water. A weight may optionally be added, most preferably near the rear base, to help the body remain upright in the water. In use, when being pulled behind a boat, the body maintains lateral movement and balance at or near the water surface that resembles a fish moving through the water. To increase the teaser or lure's attractiveness to fish, the body may be coated, stamped, or colored with fish coloration to further mimic the natural prey of fish or with a reflective material to otherwise attract the attention of fish.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 3A is a perspective view of the two planes of the body of the embodiment of the fishing teaser or lure shown in FIG. 1A, where the two planes are put together to form the bilateral configuration of the body.

FIG. 3B is a perspective view of the two planes of the body of the embodiment of the fishing teaser or lure shown in FIG. 1B, where the two planes are put together to form the bilateral configuration of the body.

DETAILED DESCRIPTION OF EXEMPLARY EMBODIMENT(S)

The following discussion references the Figures (FIGS.) which depict two example embodiments (A and B) of the invention. These embodiments are substantively similar in design and function but the numbers for the elements reflect "A" or "B" because the embodiments look different since they are designed to demonstrate that the invention can look like different fish prey to catch larger fish. For ease of reading and understanding, the discussion herein does not refer to the "A" or "B" designations with respect to the elements in the Figures.

Figure 1A:
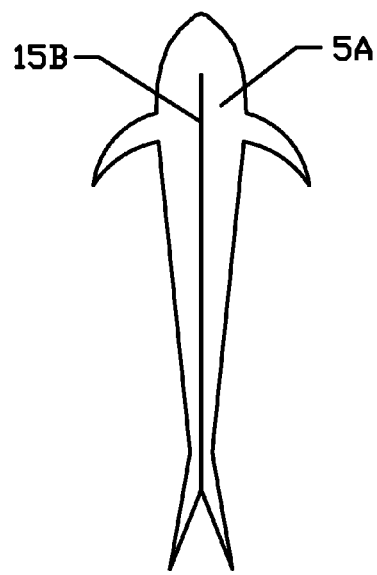
FIG. 1A is a plan or "surface" view of the "silhouette" or horizontal portion ("x" axis) of one embodiment of the fishing teaser or lure of the present invention.
Figure 2A:
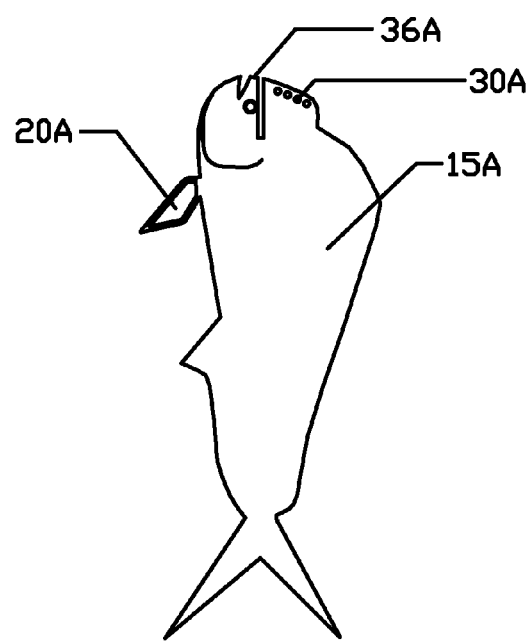
FIG. 2A is an elevation view of the "side image" or vertical portion ("y" axis) of the embodiment of the fishing teaser or lure shown in FIG. 1A, displaying the shape of an actual prey fish.
Figure 1B:
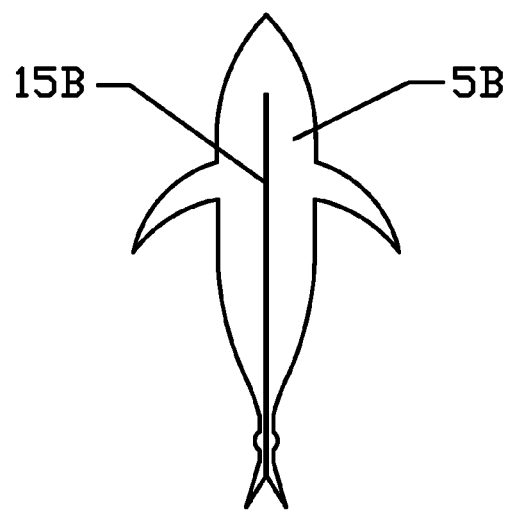
FIG. 1B is a plan or "surface" view of the "silhouette" or horizontal portion ("x" axis) of another embodiment of the fishing teaser or lure of the present invention.
Figure 2B:
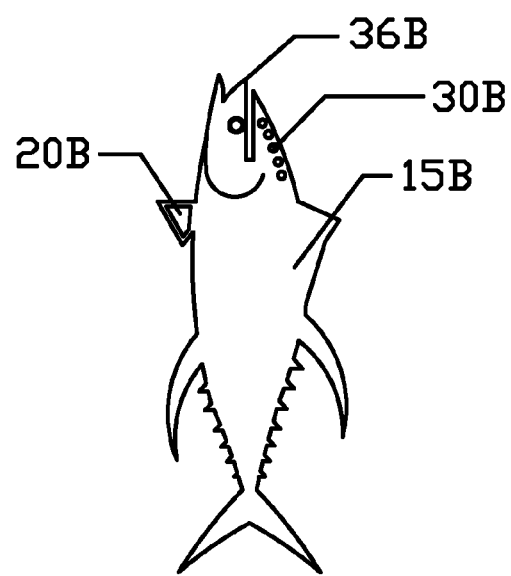
FIG. 2B is an elevation view of the "side image" or vertical portion ("y" axis) of the embodiment of the fishing teaser or lure shown in FIG. 1B, displaying the shape of an actual prey fish.
Figure 4A:
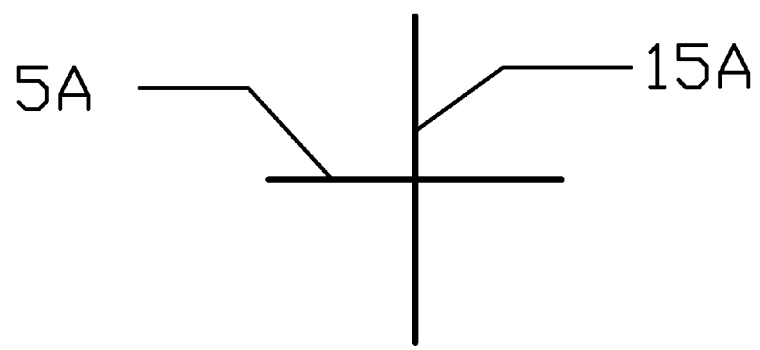
FIG. 4A is a front elevation view of the embodiment of the fishing teaser or lure shown in FIG. 1A.
Figure 4B:
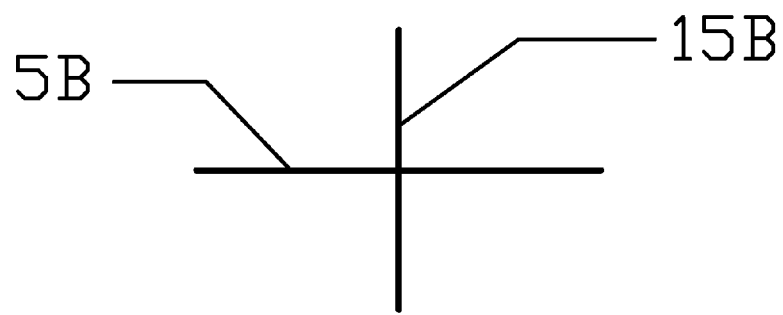
FIG. 4B is a front elevation view of the embodiment of the fishing teaser or lure shown in FIG. 1B.
Figure 5A:
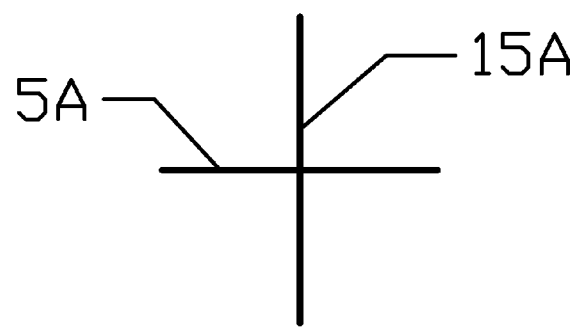
FIG. 5A is a rear elevation view of the embodiment of the fishing teaser or lure shown in FIG. 1A.
Figure 5B:
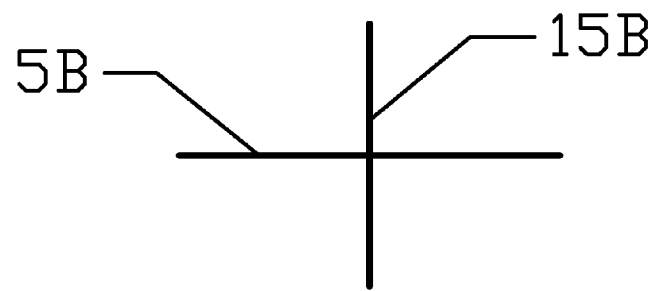
FIG. 5B is a rear elevation view of the embodiment of the fishing teaser or lure shown in FIG. 1B.

As shown in FIGS. 1 through 5, the teaser body 10 is constructed from two planar pieces 5 and 15 comprised of polycarbonate. As should be understood by those of skill in the art, various types of materials may be used to construct the teaser 10. For non-limiting example, plastic or even metal might be used as an alternative to polycarbonate. As illustrated in FIGS. 1 through 3, the teaser body 10 has an x-axis planar piece 5 and a y-axis planar piece 15. The x-axis planar piece 5 substantially represents the width of the teaser 10 and the y-axis planar piece 15 substantially represents the height of the teaser body 10. Both pieces 5 and 15 are configured in the shape of a fish known to be prey for game fish. That is, pieces 5 and 15 each have a two-dimensional outline or silhouette of a fish, so that, when combined in a perpendicular or cross-planar formation, as shown in FIGS. 3 through 5, to form the teaser body 10, the body 10 takes on a three dimensional shape that resembles a fish known to be prey for game fish, when viewed from the top, bottom and side. The pieces 5 and 15 are preferably interlockable or otherwise fit together so that connectors or fasteners such as screws or staples or bands are not needed to hold the pieces together or to hold the pieces in a perpendicular conformation one with respect to the other. Also preferably the pieces 5 and 15 may be separated for easy transport of the body 10 or for storage of the body 10 when not in use. To increase the teaser's attractiveness to fish, the body 10 may be coated, stamped, or colored with fish coloration to further mimic the natural prey of fish and/or with a reflective material to otherwise attract the attention of fish.

To aid in maintaining the teaser body 10 upright in the water, one or more weights 20, preferably comprised of lead, tungsten, steel, tin or bismuth, for example, may be positioned on the bottom of the teaser body 10, preferably on the front half of the body 10.

The teaser body 10 maintains balance and moves through water straight and/or laterally, i.e., side by side, when towed behind a boat (not shown), to replicate or resemble the movement of live bait in order to attract fish. The teaser body 10 may sit and move high in the water or along the water's surface, or may sit lower in the water, depending on the placement of one or more holes 30 in the head portion of planar piece 15, which placement affords this flexibility. In the embodiments shown in FIG. 3, the head portion of planar piece 15 has four holes 30 at different distances from the front tip or nose 36, of the body 10. Holes 30 are for tying or otherwise connecting towing line (not shown) to the teaser 10 so that the teaser 10 may be towed or pulled behind a boat (not shown). In use, usually a line is tied or connected to only one of the holes 30. Such tying to a hole 30 more toward the front or nose 36 of the body 10, results in the body 10 sitting higher in the water or on the surface of the water, and moving straighter when towed in the water, while alternatively tying to a hole higher or further back on body 10 results in the body 10 sitting lower in the water and moving more laterally or side to side when towed in the water. The configuration of the body 10 also enables the body 10 to be easily retrieved from water by a person in a boat, even without stopping the boat.

Those having ordinary skill in the art would understand that body 10 as shown in FIGS. 1 through 5 could be adapted for attaching a hook to the body so that the body might be used as a lure as well as or instead of as a teaser. Also, as would be understood by those having ordinary skill in the art, hooks and lines may be attached to one or more holes 30 in a variety of configurations other than those discussed to impart different movements of the body 10 in the water. Still further, those having ordinary skill in the art would understand that while the description above is directed to using the invention for deep sea fishing of large game fish, the teaser or lure of the invention could also be rendered for use in fishing for smaller fish in lakes, rivers and streams.

Also, the planar pieces 5 and 15 described above, while presented in one embodiment and in the drawings as flat, continuous planes, in an alternative embodiment, these pieces might comprise more than one piece each to provide further flexibility to the lure or teaser and/or to cause the lure or teaser to appear to move even more "fish" like in the water. That is, for example, the planar pieces might be provided with a hinge or other flexibility near the tail end of the pieces.

While certain embodiments of the present invention are described in detail above, the scope of the invention is not to be considered limited by such disclosure, and modifications are possible without departing from the spirit of the invention as evidenced by the following claims:

What is claimed is:

1. A fishing lure comprising a rigid bilateral body comprising two plastic or polycarbonate, flat, planar, interlockable and collapsible pieces positioned or combined in a perpendicular or crosswise interlocked manner for use as a fishing lure, with one in an x or horizontal position and the other in a y or vertical position, and further comprising a plurality of attachment points or holes for fishing line or tow line in or on the portion of the planar piece in the y position above the planar piece in the x position, which affords the body straight or lateral movement when towed in water behind a boat as a fishing lure so the lure resembles and moves like the prey of a fish, and wherein the two pieces fit together by interlocking so that connectors or fasteners are not needed to hold the pieces together in a perpendicular conformation when in use as a lure, and wherein the two pieces collapse, separate, or disengage from the interlocked perpendicular conformation for storage or for transport out of water.

2. The lure of claim 1 wherein the silhouette of the body resembles a fish when viewed from the top, bottom or side.

3. The lure of claim 1 further comprising at least one hook attached at one or more of said plurality of attachment points or holes.

4. The lure of claim 1 wherein at least one of said plurality of attachment points located in the y positioned planar piece is proximate to the x positioned planar piece and the front edge of the lure.

5. The lure of claim 1 further comprising one or more weights.

6. The lure of claim 1 wherein the body is comprised of a reflective material.

7. The of claim 1 wherein the body is colored to resemble a fish.

8. The lure of claim 1 configured for deep sea fishing.

9. The lure of claim 1 configured for fishing in streams, lakes or rivers.

10. A fishing lure for deep sea fishing of game fish comprising: a bilateral body consisting of two lightweight, rigid, flat, interlocking, planar pieces perpendicularly connected by interlocking the pieces together without need for connectors or fasteners, and having a fish silhouette; a weight; and one or more holes for attaching a towing line; wherein, one planar piece is positioned in an x or horizontal position and the other planar piece is positioned in a y or vertical position; wherein the one or more holes for towing are positioned in the portion of the planar piece in the y position above the planar piece in the x position, such that the lure is pullable in a straight or lateral direction behind a fishing boat for movement resembling prey of the game fish; and wherein the two planar pieces are collapsed, disengaged or separated for transport or storage.

11. The fishing lure of claim 10 wherein the body is comprised of polycarbonate.

12. The fishing lure of claim 10 wherein one of the planar pieces has a hinge or flexible portion near its tail end for movement resembling prey of the game fish.

13. The fishing lure of claim 10 wherein each of the planar pieces has a hinge or flexible portion near its tail end for movement resembling prey of the game fish.

14. The fishing lure of claim 10 wherein the body is colored to resemble a fish.

\* \* \* \* \*